Sept. 7, 1965 R. I. KUFFLER 3,204,340
MECHANICAL NULLING DEVICE FOR MECHANICAL GAGING
Filed April 22, 1963 3 Sheets-Sheet 1

INVENTOR.
ROLAND I. KUFFLER
BY
Lockwood, Woodard, Smith & Weikart
Attorneys

INVENTOR.
ROLAND I. KUFFLER

Sept. 7, 1965   R. I. KUFFLER   3,204,340
MECHANICAL NULLING DEVICE FOR MECHANICAL GAGING
Filed April 22, 1963   3 Sheets-Sheet 3

INVENTOR.
ROLAND I. KUFFLER
BY
Lockwood, Woodard, Smith & Weikart
Attorneys

United States Patent Office 3,204,340
Patented Sept. 7, 1965

3,204,340
MECHANICAL NULLING DEVICE FOR MECHANICAL GAGING
Roland I. Kuffler, Indianapolis, Ind., assignor to Merz-Chambers Corporation, Indianapolis, Ind., a corporation of Indiana
Filed Apr. 22, 1963, Ser. No. 274,472
5 Claims. (Cl. 33—172)

This invention relates generally to structure utilized in gaging and in particular to an apparatus for mechanically establishing a reference value for a workpiece dimension, measuring the deviation from the reference value and then wiping out or nulling the reference value or zero point to prepare the apparatus for gaging of the next succeeding workpiece.

While gaging of a statistically significant sample of parts or workpieces has in the past provided adequate quality control, gaging of one hundred percent of a run of certain parts is becoming more desirable as precision and performance standards increase. Such one hundred percent gaging, in mass production technique at least, requires mechanical gaging capable of rapidly processing a series of workpieces.

The structure of the present invention is described herein as utilized in gaging the eccentricity of the braking surface of brake drums with regard to the axis of rotation of the drum. It will be understood that the structure might be utilized either singly or in multiple to accomplish rapid gaging of various dimensional deviations other than eccentricity and on parts other than the brake drums assumed to be the workpieces in the present environmental description of the apparatus.

It is the primary object of the present invention to provide an apparatus for mechanically determining a zero or reference value of a particular dimension on a particular workpiece, measuring the deviation in the dimension over a prescribed area of the workpiece and then wiping out or nulling the reference value set into the apparatus to enable the apparatus to repeat the cycle on the next subsequent workpiece.

A further object of the present invention is to provide an apparatus for measuring the variation in a differential measurement of a physical property of a workpiece and which establishes a zero or reference value at the start of each cycle which is independent of prior measuring cycles.

These and other objects will become apparent as the description proceeds with reference to the accompanying drawings in which.

Figure 1:
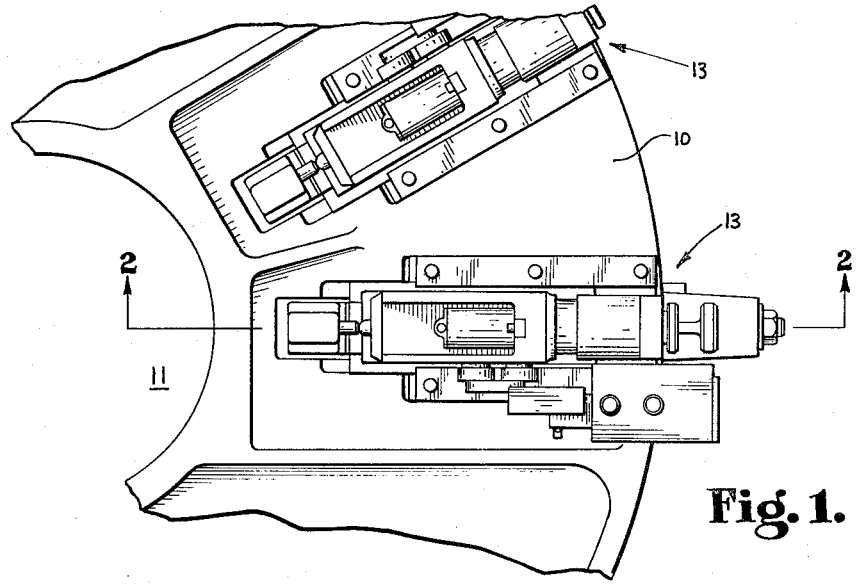
FIG. 1 is a top plan view of a portion of a composite gaging assembly using multiple assemblies each embodying the present invention.

Referring initially to FIG. 1, there is shown a stationary table 10 having an open central area 11 within which may be situated a means (not shown) for rotatably mounting a workpiece having an area to be gaged. In the specific description of the apparatus of the present invention the workpiece is assumed to be a brake drum 12, shown fragmentarily in FIG. 2. The assemblies, each of which embodies the present invention, to be described in detail hereafter, are indicated generally at 13 and are shown in FIG. 1 as mounted 30° apart with reference to the center of the table 10. While the apparatus of the present invention is described in detail herein as being used singly, it will be understood that certain gaging problems, such as the determination of ovality or out-of-roundness, requires the multiple arrangement of FIG. 1.

Referring to FIGS. 2–6, the structure of the present invention will now be described. As previously mentioned, the workpiece is in the form of a brake drum 12, having a brakeshoe contacted area 14 is mounted so as to be revolved about the brake drum axis. The particular gaging problem involved is the determination as to whether the eccentricity of the surface 14 of a production run of brake drums falls within acceptable limits. The apparatus includes a probe, indicated generally at 16 mounted intermediate its ends by means of a suitable cross-reed pivot formed by the flexible blades 17 and 18. The lower end of the probe is provided with a ball-ended member 19 which provides point contact of the probe with the area 14 of the brake drum.

The ends of the blades 17 remote from their point of attachment to the probe 16 are rigidly secured to a member 21 which is normally stationary except for a calibrating adjustment to be subsequently described. The member 21 has rigidly secured thereto a block 22 to which are rigidly secured the end portions of the cross-reed pivot blades 18. The member 21 is carried by a member 23 rigidly mounted within a track 24 in the adjacent portion of the table 10. A reference position for the member 21 with relation to the member 23 is established by means of the calibrating screw 25 carrying a lock nut 25a. By loosening the lock nut 25a the adjusting screw 25 may be threaded inwardly or outwardly with relation to the member 23 so as to position the member 21 so that the pivotal axis of the probe, the point of intersection of the pivot blades 17 and 18, lies generally vertically beneath the point of engagement of the free end of the probe 16 with a movable member to be subsequently described. Such calibrating adjustment is desirable in order to provide for a pivot action for the probe giving minimum error in the gaging operation.

Figure 2:
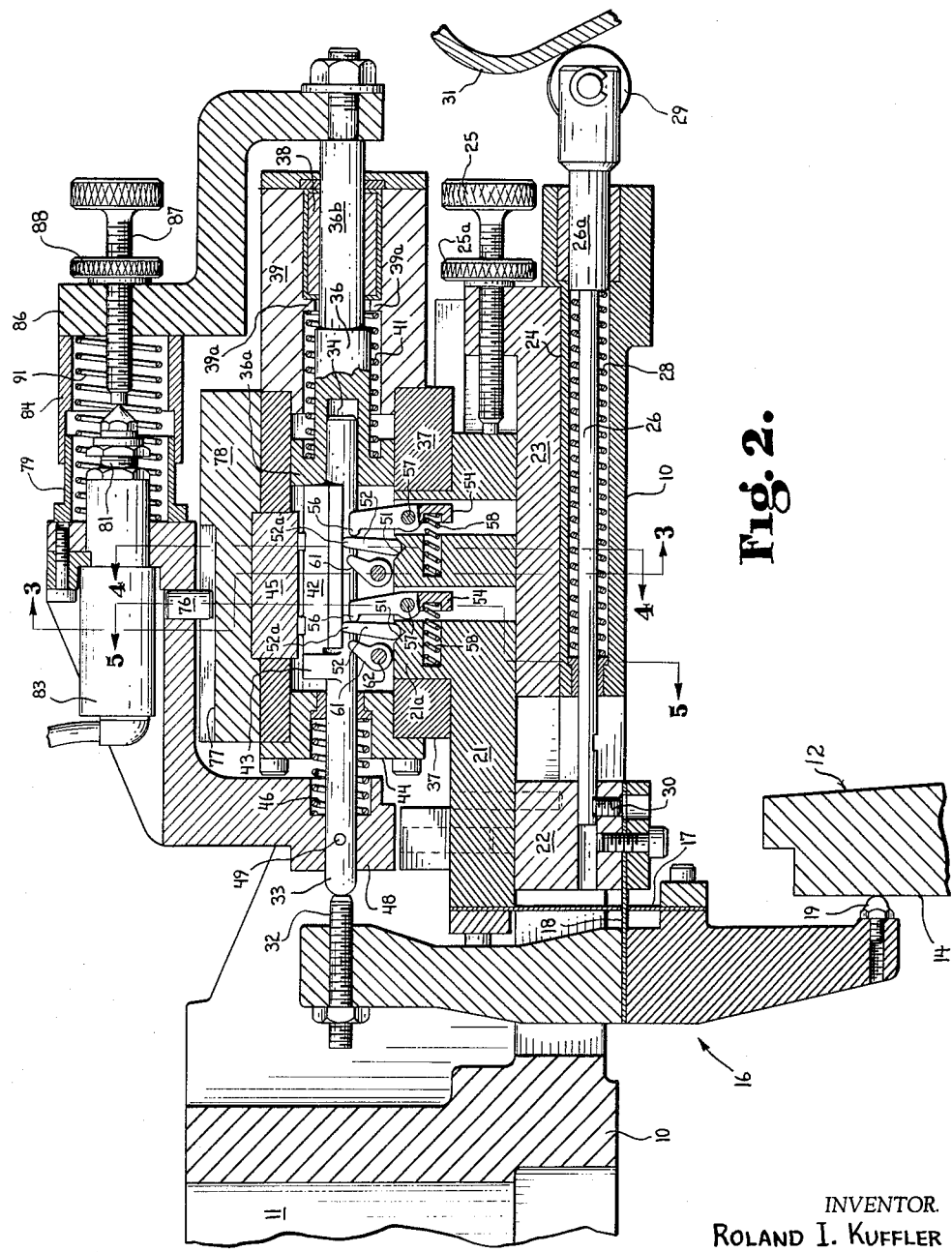
FIG. 2 is a side sectional view taken generally along the line 2—2 of FIG. 1 and showing in detail the construction of an assembly embodying the present invention.

Directly beneath the member 21 the table 10 is provided with a bore which accommodates a shaft 26. The left end of the shaft 26 extends into the block 22 and is rigidly attached thereto by means of the set screw 30. The opposite end of the shaft 26 carries an enlarged collar 26a which provides a shoulder engaging a compression spring 28. The opposite end of the spring 28 bottoms against a shoulder formed at the end of the bore accommodating the shaft 26 and the spring 28 thus biases the shaft 26 rightwardly as viewed in FIG. 2. The shaft 26 extends beyond the table 10 and carries at its extending end a cam follower 29 which engages a cam 31 shown only fragmentarily in FIG. 2. The shaft 26 and the cam 31 function only when the apparatus shown in FIG. 2 is indexed vertically upwardly as the apparatus is lowered into a brake drum. Thus as the table 10 is moved upwardly by apparatus not shown or claimed herein the cam 31 will move the shaft 26 leftwardly and this leftward movement of the shaft 26 will move the block 22, the probe 16, the member 21 and all of the parts of the apparatus carried by the member 21 leftwardly so as to assure that the end 19 of the probe will be out of interfering contact with any portion of a brake drum or similiar workpiece being loaded into the apparatus. It will be understood that this sidewardly indexing function of the device and the components making such indexing motion possible do not form a part of the present invention.

As may be seen in FIG. 2, the upper, free end of the probe 16 carries a threaded abutment member 32 which may be adjustably positioned with relation to the probe and which engages a first movable member taking the form of a rod or shaft 33. The shaft 33 is mounted for rectilinear motion (rightwardly and leftwardly as viewed in FIG. 2) by its extension into an accommodating bore 34 in a member 36. The member 36 has an enlarged end 36a which is slideable within an accommodating aperture in an irregularly formed block 37 carried by the member 21.

The member 37 carries a fixed sleeve 39 which encircles the member 36 and through which the shank portion 36b of the member 36 extends. A bearing 38 supports the shank portion 36b but permits motion of the member 36 with relation to the sleeve 39. A compression spring 41 extends between a shoulder 39a formed in the interior bore of the member 39 and a groove formed in the head 36a of the member 36. The spring 41 serves to bias the member 36 leftwardly into engagement with the end of a floating, positioning member 42.

Figure 3:
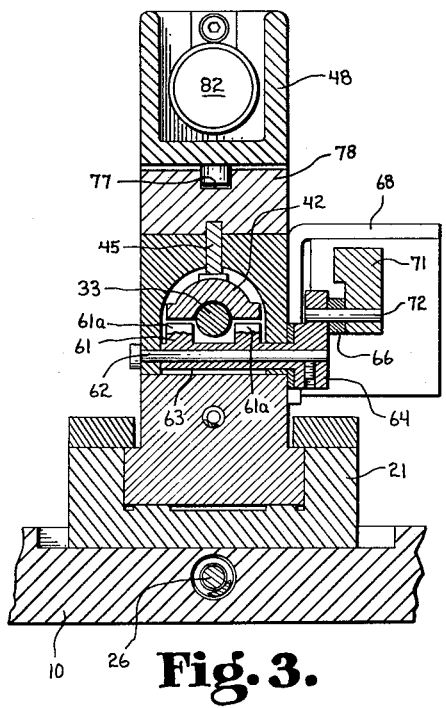
FIG. 3 is a sectional view taken generally along the line 3—3 of FIG. 2.
Figure 4:
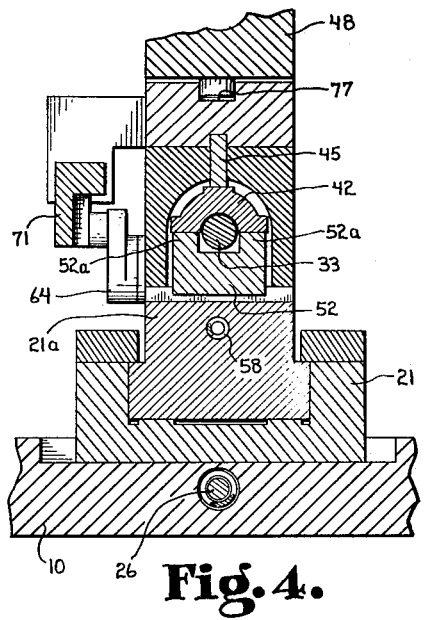
FIG. 4 is a sectional view similar to FIG. 3 but taken generally upon the line 4—4 of FIG. 2.
Figure 5:
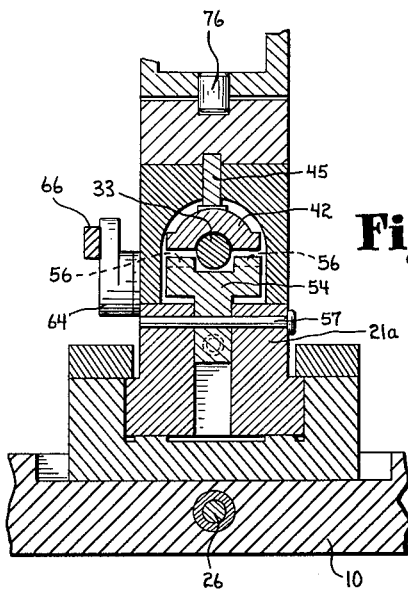
FIG. 5 is a sectional view taken generally along the line 5—5 of FIG. 2.

Th positioning member 42 is arcuate in cross-sectional configuration as will be evident from FIGS. 3, 4, and 5. The upper surface of the member 42 is provided with bosses which slideably engage a bar 45 carried by the sleeve 37. The left end (as viewed in FIG. 2) of the positioning member 42 is engaged by an abutment or lug 43 which extends from and is integral with the shaft 33. A flanged member 44 is rigidly secured to the member 37 and is provided with an aperture through which the shaft 33 extends. A shoulder formed internally within the member 44 is engaged by a compression spring 46. The compression spring bottoms on a shoulder formed in a member 48 rigidly locked to the shaft 33 by means of a pin 49. The member 48 forms a part of a superstructure carried by the shaft 33 and to be subsequently described. It will be evident from FIG. 2 that the spring 46 functions to urge the shaft 33 leftwardly (as viewed in FIG. 2) and thereby maintain the contact of the probe end 19 with the workpiece surface 14.

A portion 21a of the member 21 extends upwardly adjacent the member 37 and its upper surface carries transverse, V-shaped grooves 51. Seated within the grooves 51 are identical members 52 whose configuration will be evident from FIG. 4. The members 52 are generally U-shaped so as to provide upwardly extending arms 52a. When in their operative position, as shown in FIG. 2, the arms engage the under face of the floating member 42 at a binding angle which permits motion of the positioning member 42 rightwardly but does not permit motion of the member 42 in the opposite direction. The arms 52a are biased into their operative position, in binding engagement with the positioning member 42, by means of identical, pivotally mounted members 54. As will be evident from FIG. 5 each of the members 54 includes upwardly extending fingers 56 which engage the adjacent surface of the arms 52a. The central portion of each of the members 54 is pivotally supported by a transverse pin 57 journaled in the portion 21a of the member 21. Compression springs 58 serve to bias the members 54 counterclockwise as viewed in FIG. 2 so as to urge the tips of the arms 52a into engagement with the under side of the positioning member 42.

From the foregoing it will be evident that any rightward motion of the shaft 33, brought about by rightward motion of the probe end 32 will cause the positioning member 42 to move rightwardly. Movement of the positioning member 42 rightwardly also positions the member 36 rightwardly in proportion to the rightward motion of the shaft 33. Any subsequent leftward motion of the shaft 33, since the positioning member 42 will be held by the arms 52a, will separate the abutment 43 from the end of the positioning member 42 and the positioning member 42 will not follow such leftward motion of the shaft 33.

Figure 6:
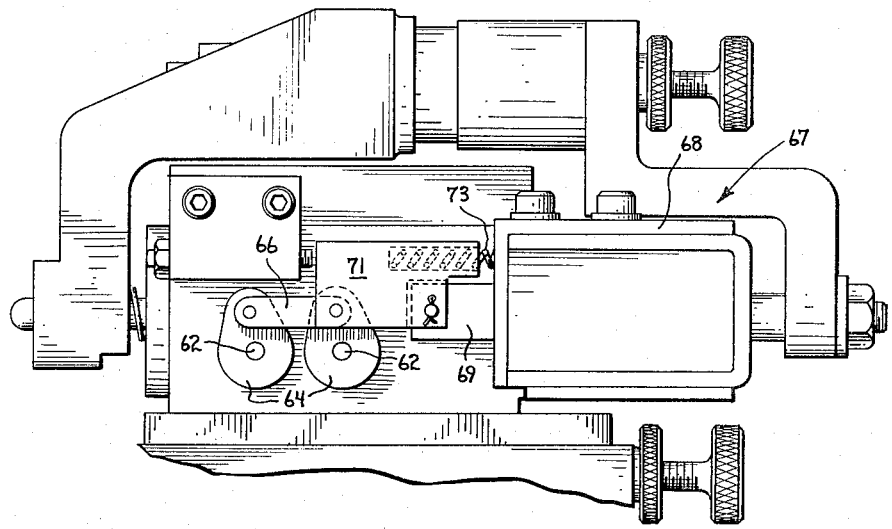
FIG. 6 is a fragmentary side view similar to FIG. 2 but not in section.

A means for releasing the positioning member 42 to permit it to move leftwardly under the force exerted by spring 41 is provided by the members 61. As may best be seen in FIG. 3 each of the members 61 is provided with extending portions 61a which, upon clockwise (as viewed in FIG. 2), movement of the extending portion 61a about the pivot pins 62, engage the arms 52a and move them clockwise against the force exerted by the biasing springs 58 so that the tips of the arms 52a free the positioning member 42 permitting it to move leftwardly. As will be evident from FIGS. 3 and 6 the members 61 include a sidewardly extending portion 63 in the form of a sleeve enclosing the pivot pin 62. An enlarged portion 64 of the member 61 is rigidly secured by any suitable means such as a set screw to the pin 62. The enlarged portions 64 are eccentrically formed as will be evident from FIG. 6 and their lobes are joined by a connecting crank 66. A means for reciprocating the connecting link 66 (thereby rotating the members 64 through a small angular displacement) is provided by the solenoid assembly 67 (FIG. 6). The solenoid assembly is of conventional construction and is supported on a mounting bracket 68. The assembly includes a plunger 69 which is moved rightwardly, as viewed in FIG. 6, when the solenoid coil is energized. A member 71 which is generally L-shaped in cross-section is pivotally linked to the free end of the solenoid plunger 69 and to the lobe of the member 64 nearest the solenoid. As will be evident from FIG. 3, a pin 72 provides a common pivotal attachment for the member 71, the connecting link 66 and the lobe of the adjacent member 64. As will be evident from FIG. 6, a compression spring 73 extends into a bore formed in the upper portion of the member 71 and serves to bias the solenoid plunger 69 and the parts connected thereto leftwardly as viewed in FIG. 6. The spring 73 thus acts as a return spring for the solenoid and it will be understood that the force exerted by spring 73 is overcome when the plunger 69 is drawn into the solenoid upon its energization.

Referring again to FIG. 2, as previously mentioned, the shaft 33 has rigidly secured thereto the generally L-shaped member 48. The upper leg of the member 48 extends parallel to the axis of motion of the shaft 33 and a pin 76 carried by the member 48 rides within a slot 77 formed in the upper face of a bar 78 rigidly secured to the member 37. The free end of the member 48 terminates in a cylindrically shaped member 79.

Extending axially through the member 79 is the plunger component 81 of a conventional differential transformer structure 82. The differential transformer is merely one means for transforming into an electrical impulse the magnitude of leftward or inward motion of the plunger 81. The plunger 81 is conventionally spring biased outwardly or rightwardly as viewed in FIG. 2. The member 79 moves within a cylindrical member 84 which is carried by a further, generally L-shaped member 86. The lower end of the member 86 is rigidly secured to the shank 36b of the member 36. Threaded through the member 86 and extending axially within the cylindrical member 84 is a calibrating screw 87 carrying a locknut 88. The tip of the calibrating screw 87 engages the tip of the plunger 81 for the differential transformer. From the foregoing it will be evident that the relative position of the members 48 and 86 will determine the degree of depression of the plunger 81 and thereby determine the magnitude of the electrical signal produced by the differential transformer 82. A compression spring 91 extends between the members 48 and 86 and serves to bias these two members apart and also serves to take up any backlash at the bushing 38 and adjacent guides and linkage. It will be understood that the force exerted by spring 91 tending to move the member 86 rightwardly as viewed in FIG. 2 is less than the force exerted by the spring 41 tending to move the member 36 and hence the member 86 leftwardly.

In operation, assuming the parts of the assembly to be in the positions shown in FIG. 2, the tip 19 of the probe will be in engagement with the surface 14 of the brake drum 12 and the positioning member 42 will be in an intermediate position determined by the position of the rod 33. If the brake drum 12 is now rotated about its own axis so as to move the surface 14 relative to the probe, any decrease in radius of the surface 14 will pivot the probe clockwise as viewed in FIG. 2. Such movement of the probe will drive the shaft 33 rightwardly and through the abutment 43 will move the positioning member 42 rightwardly. Movement of the positioning member 42 rightwardly will, in turn, position the structure formed by the elements 36 and 86 rightwardly. During this rightward movement, the member 48 will also be displaced rightwardly so that although the relative positions of the members 48 and 86 does not change, these members are shifted rightwardly from their position of FIG. 2. After a complete excursion of the brake drum beneath the probe, that is, a rotation of the brake drum through 360°, the smallest radius of the surface 14 will have been established and the position of the positioning member 42 and consequently member 86 will be fixed with relation to this deviation of the surface 14.

A second rotation of the brake drum 12 with relation to the probe 16 will cause the probe to again move in response to variations in the radius of the surface 14. As the probe traverses the surface 14, the rod 33 and consequently the member 48 will be positioned leftwardly an amount directly proportional to the amount of variation of the radius of the surface 14 from its minimum value established or recorded on the prior excursion of the brake drum beneath the probe. Since the positioning member 42 and consequently the member 86 cannot follow this leftward motion of the shaft 33 because of the binding effect of the arms 52a, the position of the member 48 with relation to the member 86 will at any instant be proportional to the variation in the radius of the surface 14 from its minimum value indicated by the rightward positioning of the member 86. The relative displacement of the first element, which takes the specific form of the member 48 and shaft 33 locked thereto, and the second element, which takes the specific form of the L-shaped member 86 and member 36 attached thereto, is thus a direct function of the maximum variation in dimension over the workpiece area. Information concerning this relative positioning of members 48 and 86 is, of course, transformed into an electrical signal by the differential transformer 82 and is transmitted to a suitable control apparatus which may function to mark, eject or otherwise indicate a particular brake drum in which this variation in the radius of the surface 14, as indicated by the degree of separation of the members 48 and 86, exceeds a predetermined tolerance value.

After a particular brake drum has been processed, the apparatus may be reloaded with the next brake drum automatically and by means of a suitable control circuit (not shown) the solenoid 67 may be energized to rotate the member 61 so as to release the arms 52a from the positioning member 42 permitting the member 42 and consequently the members 36 and 86 to again assume a position in which the positioning member 42 is in engagement with lug 43 on the shaft 33. The null or zero position thus established by positioning of the member 42 is thereby wiped out so that the apparatus is conditioned to proceed through the next gaging cycle on the next workpiece. The zero or null position established by the initial excursion of the brake drum beneath the probe is thus wiped out so that for each drum processed a new zero position is established permitting rapid and accurate gaging of the eccentricity of the surface 14, for example, on each of a production run of brake drums.

From the foregoing it will be evident that the structure described provides a means by which workpieces may be rapidly and conveniently provided 100 percent inspection. It should also be noted that the proper operation of the apparatus, that is, the accuracy of the positioning of the first and second elements typified by members 48 and 86, is independent of the degree of wear on the probe point 19. The structure is relatively uncomplicated and yet provides an accurate gaging function. While a differential transformer has been schematically shown and described as the element through which the information regarding relative positioning of the components is transferred to a gage or otherwise made usable, it will be understood that other devices for facilitating reading or visually inspecting this information could be utilized in place of the differential transformer.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. An apparatus for gaging the maximum variation in dimension over a predetermined area of a workpiece, said apparatus comprising a positioning member mounted for rectilinear motion in either of two directions, a probe pivotally mounted intermediate its ends and having a portion on one side of its pivotal mounting adapted to have point engagement with the workpiece area to be gaged, a first element mounted for rectilinear motion on a line parallel to the line of motion of said positioning member and engaged by said probe on the other side of said pivotal mounting of the probe, means for transmitting motion in one direction only of said first element to said positioning member, a second element mounted for rectilinear motion on a line parallel to the line of motion of said positioning member, means biasing said second element into engagement with said positioning member and biasing both said second element and said positioning member into an initial position whereby motion of said positioning member in said one direction produced by motion of said first element also moves said second element in said one direction out of their said initial position, a plurality of pivotally mounted arms biased to an operative position engaging said positioning member at a binding angle which permits motion of said positioning member in said one direction but prevents motion thereof in the opposite direction, release members mounted adjacent each of said arms and operable, when actuated, to move said arms out of their said operative position to release said positioning member for motion in either of said directions, whereby with said arms in operative position as the workpiece is moved relative to said probe to provide an initial excursion of said probe over the area to be gaged, the maximum unidirectional motion of said probe moves said positioning member, and consequently said second element, in said one direction to a reference position, and a subsequent excursion of said probe over said area provides a maximum unidirectional motion of said probe producing movement of said first element in the other direction to place said first element in a reference position, the relative displacement of said first and second elements when in their reference positions being a direct function of the maximum variation in dimension over the workpiece area, actuation of said release members permitting said positioning element and said second member to reset to their said initial position.

2. An apparatus for gaging the maximum variation in dimension over a predetermined area of a workpiece said apparatus comprising a positioning member mounted for rectilinear motion in either of two directions, a probe having a portion adapted to engage the workpiece area to be gaged, a first element mounted for rectilinear motion on a line parallel to the line of motion of said positioning member and engaged by said probe, means for transmitting motion in one direction only of said first element to said positioning member, a second element mounted for rectilinear motion on a line parallel to the line of motion of said positioning member, means biasing said second element into engagement with said positioning member and biasing both said second element and said positioning member into an initial position whereby motion of said positioning member in said one direction produced by motion of said first element also moves said second element in said one direction out of their said initial position, a plurality of pivotally mounted arms biased to an operative position engaging said positioning member at a binding angle which permits motion of said positioning member in said one direction but prevents motion thereof in the opposite direction, release members mounted adjacent each of said arms and operable, when actuated, to move said arms out of their said operative position to release said positioning member for motion in either of said directions, whereby with said arms in operative position as the workpiece is moved relative to said probe to provide an initial excursion of said probe over the area to be gaged, the maximum unidirectional motion of said probe moves said positioning member, and consequently said second element, in said one direction to a reference position, and a subsequent excursion of said probe over said area provides a maximum unidirectional motion of said probe producing movement of said first element in the other direction to place said first element in a reference position, the relative displacement of said first and second elements when in their reference positions being a direct function of the maximum variation in dimension over the workpiece area, actuation of said release members permitting said positioning member and said second element to reset to their said initial position.

3. An apparatus for gaging the maximum variation in dimension over a predetermined area of a workpiece said apparatus comprising a positioning member mounted for rectilinear motion in either of two directions, a probe having a portion adapted to engage the workpiece area to be gaged, a first element mounted for rectilinear motion on a line parallel to the line of motion of said positioning member and engaged by said probe, means for transmitting motion in one direction only of said first element to said positioning member, a second element mounted for rectilinear motion on a line parallel to the line of motion of said positioning member, means biasing said second element into engagement with said positioning member and biasing both said second element and said positioning member into an initial position whereby motion of said positioning member in said one direction produced by motion of said first element also moves said second element in said one direction out of their said initial position, an arm biased to an operative position engaging said positioning member at a binding angle which permits motion of said positioning member in said one direction but prevents motion thereof in the opposite direction, a release member mounted adjacent said arm and operable, when actuated, to move said arm out of its said operative position to release said positioning member for motion in either of said directions, whereby with said arm in operative position as relative motion between the workpiece and said probe occurs there is provided an initial excursion of said probe over the area to be gaged, the maximum unidirectional motion of said probe moves said positioning member, and consequently said second element, in said one direction to a reference position, and a subsequent excursion of said probe over said area provides a maximum unidirectional motion of said probe producing movement of said first element in the other direction to place said first element in a reference position, the relative displacement of said first and second elements when in their reference positions being a direct function of the maximum variation in dimension over the workpiece area, actuation of said release member permitting said positioning member and said second element to reset to their said initial position.

4. An apparatus for gaging the maximum variation in dimension over a predetermined area of a workpiece said apparatus comprising a positioning member mounted for rectilinear motion in either of two directions, a probe having a portion adapted to engage with the workpiece area to be gaged, a first element mounted for rectilinear motion on a line parallel to the line of motion of said positioning member and engaged by said probe, means for transmitting motion in one direction only of said first element to said positioning member, a second element mounted for rectilinear motion on a line parallel to the line of motion of said positioning member, means biasing said second element into engagement with said positioning member and biasing both of said second element and said positioning member into an initial position whereby motion of said positioning member in said one direction produced by motion of said first element also moves said second element in said one direction out of their said initial position, holding means biased to an operative position and cooperating with said positioning member when in said operative position to permit motion of said positioning member in said one direction but to prevent motion thereof in the opposite direction, release means operable, when actuated, to remove said holding means out of its said operative position to release said positioning member for motion in either of said directions, whereby with said holding means in operative position as relative motion between the workpiece and said probe occurs there is provided an initial excursion of said probe over the area to be gaged, the maximum unidirectional motion of said probe moves said positioning member, and consequently said second element, in said one direction to a reference position, and a subsequent excursion of said probe over said area provides a maximum unidirectional motion of said probe producing movement of said first element in the other direction to place said first element in a reference position, the relative displacement of said first and second elements when in their reference positions being a direct function of the maximum variation in dimension over the workpiece area, actuation of said release means permitting said positioning element and said second member to reset to their said initial position.

5. In a gaging device, a positioning member mounted for rectilinear motion in either of two directions, a first element adapted to move in one of said two directions in response to change in one sense of the condition to be gaged and to move in the other of said two directions in response to change in the opposite sense of the condition to be gaged, said first element displacing said positioning member in said one direction as it moves in that direction, holding means cooperating with said positioning member to prevent motion thereof in said other direction, a second element positioned by motion of said positioning member in said one direction, and means biasing said positioning member and said second element in said other direction, whereby motion of said first element in said one direction positions said second element in response to change of the gaged condition in said one sense and motion of said first element in said other direction establishes a displacement between said first and second elements proportional to the differential change in said gaged condition, release of said holding means permitting said positioning member and said second element to move in said other direction under the force exerted by said biasing means to wipe out said proportional displacement of said first and second elements.

References Cited by the Examiner

UNITED STATES PATENTS 2,453,576  11/48  Jacob _____ 33—147

ISAAC LISANN, *Primary Examiner.*